No. 774,998. PATENTED NOV. 15, 1904.
R. W. WILLSON.
EDUCATIONAL OR SCIENTIFIC DEVICE.
APPLICATION FILED JULY 1, 1904.
NO MODEL.

WITNESSES-
INVENTOR=

No. 774,998. Patented November 15, 1904.

UNITED STATES PATENT OFFICE.

ROBERT W. WILLSON, OF CAMBRIDGE, MASSACHUSETTS.

EDUCATIONAL OR SCIENTIFIC DEVICE.

SPECIFICATION forming part of Letters Patent No. 774,998, dated November 15, 1904.

Application filed July 1, 1904. Serial No. 214,869. (No model.)

*To all whom it may concern:*

Be it known that I, ROBERT W. WILLSON, of Cambridge, in the county of Middlesex and State of Massachusetts, have invented a new and useful Improvement in Educational or Scientific Devices, of which the following, taken in connection with the accompanying drawings, is a specification.

My invention relates to educational or scientific devices adapted to teaching or demonstrating the principles of astronomy or spherical geometry; and it consists in a portion of a thin spherical shell, preferably of transparent material, bounded in part by great circles at convenient angles to each other and adapted to fit closely the curvature of a spherical surface upon which it is applied in use. It is also suitably graduated and may thus be used for measuring distances or angles on a spherical surface in the same manner as a scale, protractor, or straight-edge is used upon a plane surface, the bounding edges serving as guides for a pen or pencil.

In making drawings and geometrical figures on a spherical surface the arcs of great circles exercise the same functions as straight lines in drawings or diagrams on a plane surface. At present no suitable instrument exists for drawing diagrams on a spherical surface such as must be used in demonstration of the principles of spherical geometry. The only instruments now in use for such purposes are the compasses or dividers, and to draw the shortest line between two points on a sphere requires several operations with the dividers. In order to simplify and expedite operations of this nature, I have invented my improved spherical measure and ruler, by which such a line may be drawn as easily as the straight line joining two points on a plane may be drawn by a straight-edge. It also serves to lay off a right angle on the sphere as the T-square and triangle serve in the plane and to measure and lay off angles or distances on the sphere as the protractor or scale serves in the plane. It may also be used with dividers to hold the point or center in any desired location.

I preferably use my spherical measure or rule in combination with a suitable spherical surface admitting the use of pencil and eraser, and for this purpose preferably use a thick hemispherical shell of unglazed porcelain or similar material, the concave under side giving it desirable lightness as well as furnishing a convenient shape for grasping it firmly.

Figure 1:
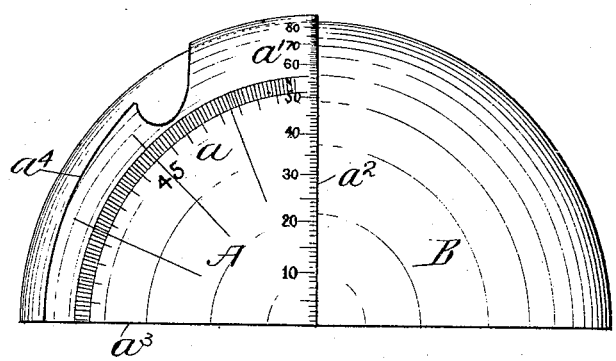
Figure 2:
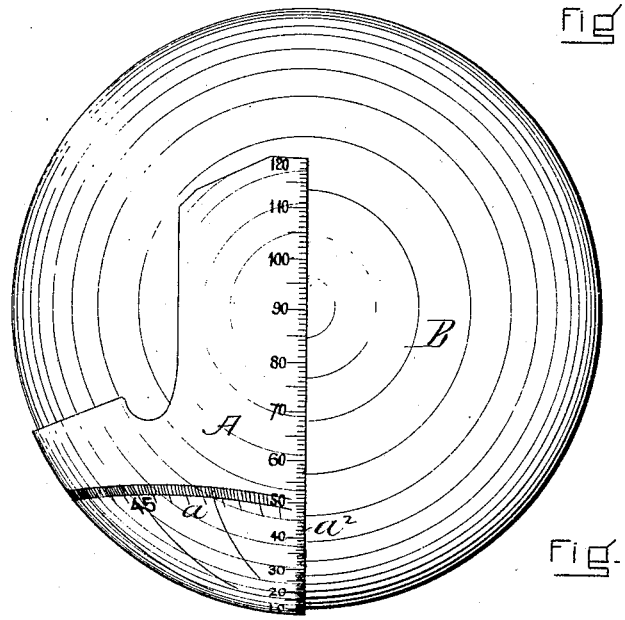
Figure 3:
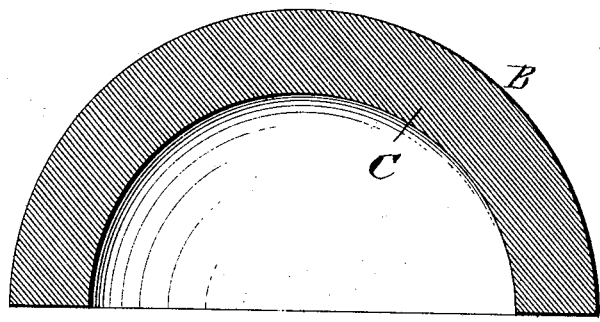
Figure 4:
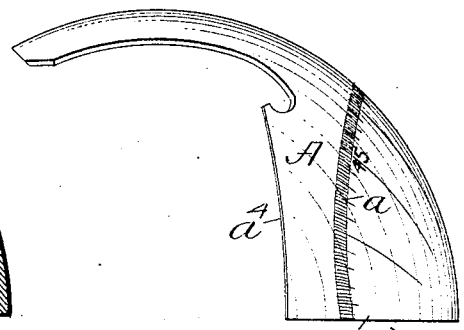

Referring to the accompanying drawings, wherein like letters represent like parts, Figure 1 shows an elevation of a hemisphere provided with my improved spherical measure and ruler. Fig. 2 shows a plan of same. Fig. 3 shows a section of the hemispherical shell with which is used my improved spherical measure and ruler. Fig. 4 is an elevation of my improved spherical measure and ruler detached from the spherical surface on which it is used.

In the drawings, A is my improved spherical measure and ruler, consisting of a thin preferably transparent shell, having the suitable graduations $a\ a'$ and bounded by the edges $a^2\ a^3\ a^4$, which form great circles of the spherical surface B, on which the shell A closely fits. The spherical surface B, I preferably form by the outside surface of a thick hemispherical shell C, as shown in Fig. 3.

It will be observed that when the hemispherical surface rests on a plane with one of the edges $a^3$ of the spherical ruler also resting on the plane the ruler may be moved about the hemisphere, and as long as the edge $a^3$ rests on the plane the other two edges $a^2$ and $a^4$ will make right angles with the plane in the same way that a T-square always makes right angles with the edge of the drawing-board with which it is used. Further, it will be observed that in whatever position on the surface B the shell A is placed its edges $a^2\ a^3\ a^4$ will always describe great circles on the surface B the same as a straight-edge always makes straight lines on a plane surface. Further, it may be observed that the graduated arc $a$ may be centered upon the vertex of an angle on the spherical surface B, so that the angles may be measured or determinate angles laid off by the use of one edge of the spherical protractor or ruler as a guide for the pencil in a manner similar to the use of a protractor on a plane surface.

I claim—

1. In an educational or scientific device a spherical surface in combination with a portion of a spherical shell conforming closely to the curvature of the said spherical surface and adapted to be used for diagrams or measurements thereon substantially as described.

2. In an educational or scientific device a hollow hemisphere having a spherical surface adapted for the use of pencil and eraser in combination with a portion of a spherical shell conforming closely to the curvature of the said spherical surface and adapted to be used as a ruler or measure thereon substantially as described.

3. In an educational or scientific device a hemispherical shell, having an outer surface adapted for the use of pencil and eraser and an inner surface of convenient shape for grasping it firmly in combination with suitable means for making diagrams or measurements upon said outer spherical surface substantially as described.

4. In an educational or scientific device a spherical ruler comprising a portion of a spherical shell, bounded in part by great circles at convenient angles to each other, in combination with a spherical surface of the same curvature as the inner surface of the said spherical ruler, substantially as described.

5. In an educational or scientific device, a spherical scale or protractor comprising a portion of a spherical shell provided with suitable graduations in combination with a spherical surface of similar curvature substantially as described.

6. In an educational or scientific device a spherical ruler and measure comprising a portion of a spherical shell, bounded in part by great circles at convenient angles to each other and provided with suitable graduation in combination with a spherical surface of similar curvature substantially as described.

7. In an educational or scientific device, the portion A of a spherical shell having the graduations $a$ and $a'$, and the edges $a^2$, $a^3$ and $a^4$ formed by great circles in combination with the spherical surface B, substantially as described.

In testimony whereof I have signed my name to this specification, in the presence of two subscribing witnesses, on this 23d day of June, A. D. 1904.

ROBERT W. WILLSON.

Witnesses:
   A. H. FLANNERY,
   FRED JOY.